May 3, 1938.    W. B. OSBORNE    2,115,963
PLANETARY GEAR DRIVE
Filed April 2, 1934    2 Sheets-Sheet 1

INVENTOR.
William B. Osborne,
BY
Hood + Hahn.
ATTORNEYS

May 3, 1938.　　　W. B. OSBORNE　　　2,115,963
PLANETARY GEAR DRIVE
Filed April 2, 1934　　　2 Sheets-Sheet 2

INVENTOR.
William B. Osborne,
BY
Hood + Hahn
ATTORNEYS

Patented May 3, 1938

2,115,963

UNITED STATES PATENT OFFICE 2,115,963

PLANETARY GEAR DRIVE

William B. Osborne, Muncie, Ind., assignor, by mesne assignments, to Borg-Warner Corporation, Chicago, Ill., a corporation of Illinois Application April 2, 1934, Serial No. 718,536

10 Claims. (Cl. 74—290)

My invention relates to improvements in transmission gearing and particularly to a type of transmission gearing primarily for use in driving aeroplane propellers.

In certain periods of its operation, especially when the plane is taking off from the ground and climbing, it is more desirable to use full motor torque at the start in order to overcome the increased load of the plane at this period. Furthermore, it is highly desirable in starting to obtain full motor torque and it is particularly desirable to be able to run the engine wide open at the initial starting of the plane. As a rule aeroplane engines develop their highest efficiency on wide open throttle. With the engine directly connected to the propeller shaft the engine does not develop full motor torque in starting until after the plane has traveled some four or five hundred feet.

Furthermore, in starting it is desirable to drive the propeller at a reduced speed. If the propeller is operated in starting at its maximum speed, considerable slippage occurs and the blades tend to create a vacuum and thus lose their grip on the air.

One means of overcoming the above-mentioned difficulty heretofore practiced in commercial use has been that of reducing the propeller pitch to allow the engine to speed up to its peak of power quickly. One disadvantage of such a construction is that the propeller loss is quite great due to higher speed and reduced pitch. Another disadvantage, from a commercial standpoint, is the extremely high cost of propellers which have changeable pitch.

My invention contemplates the obtaining of full engine torque in starting, at the outset, while maintaining a comparatively slowly revolving propeller and without changing the pitch of the propeller.

By the use of my invention I am enabled to obtain full engine torque at the initial starting moment and drive the propeller at a relatively slower speed until the take-off has been accomplished and the plane has mounted past its climbing point. After attaining this position, by my invention, I can directly connect the engine shaft to the propeller shaft for obtaining the greatest efficiency in continued flight.

For accomplishing the above results I provide a transmission gearing through which the propeller shaft is driven at a reduced speed from the engine, which gearing may be connected to the engine shafts by a simple operation on the part of the operator, and I further provide means whereby at no time during the shift from direct to low speed or from low speed to direct, is the propeller shaft entirely disconnected from the engine shaft.

For the purpose of disclosing my invention I have illustrated certain embodiments thereof in the accompanying drawings in which Fig. 1 is a side elevation of a transmission embodying my invention;

Figure 1:
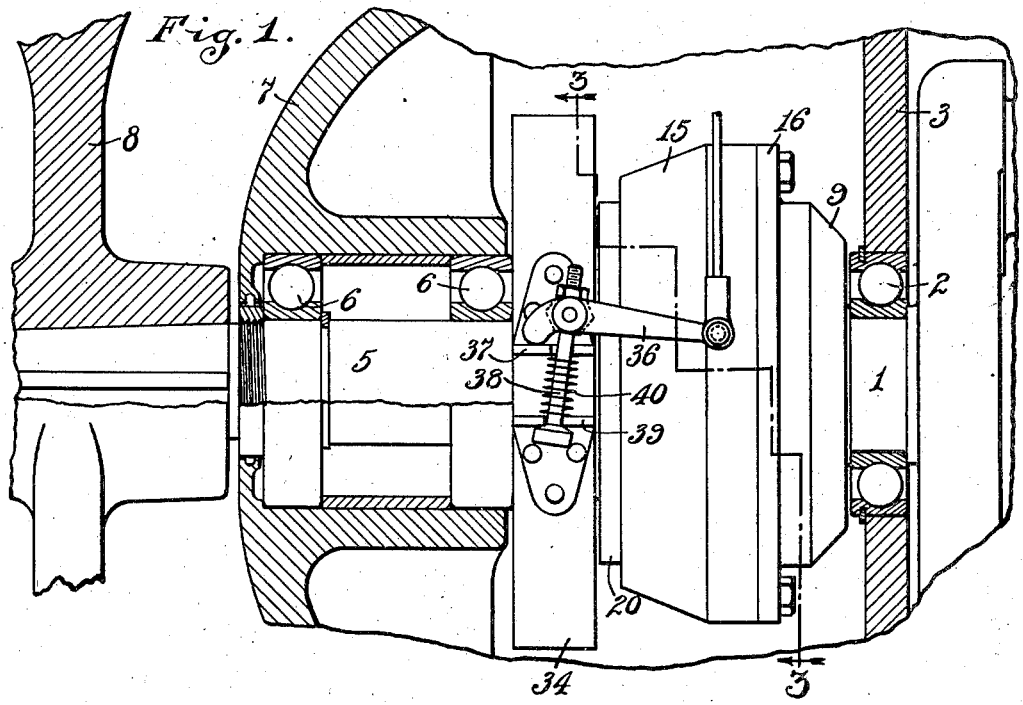
Figure 2:
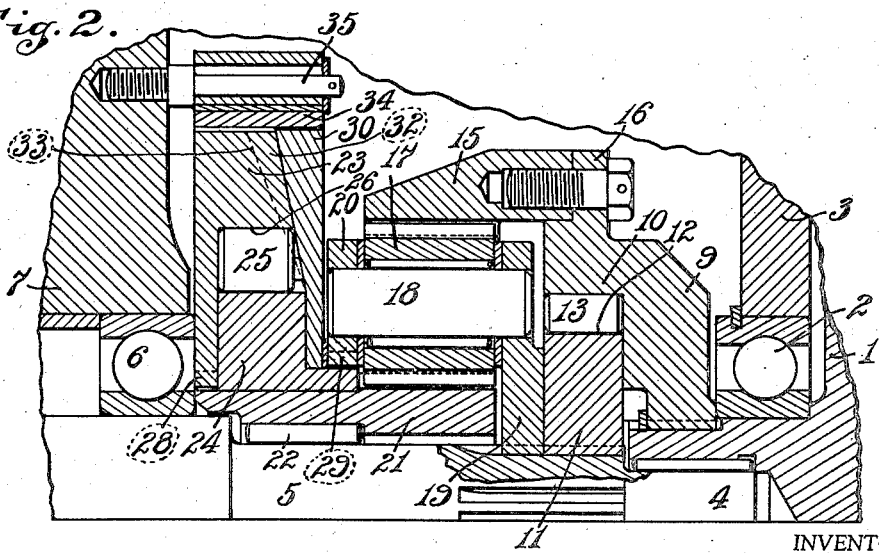
Fig. 2 is a horizontal sectional view of the transmission.
Figure 3:
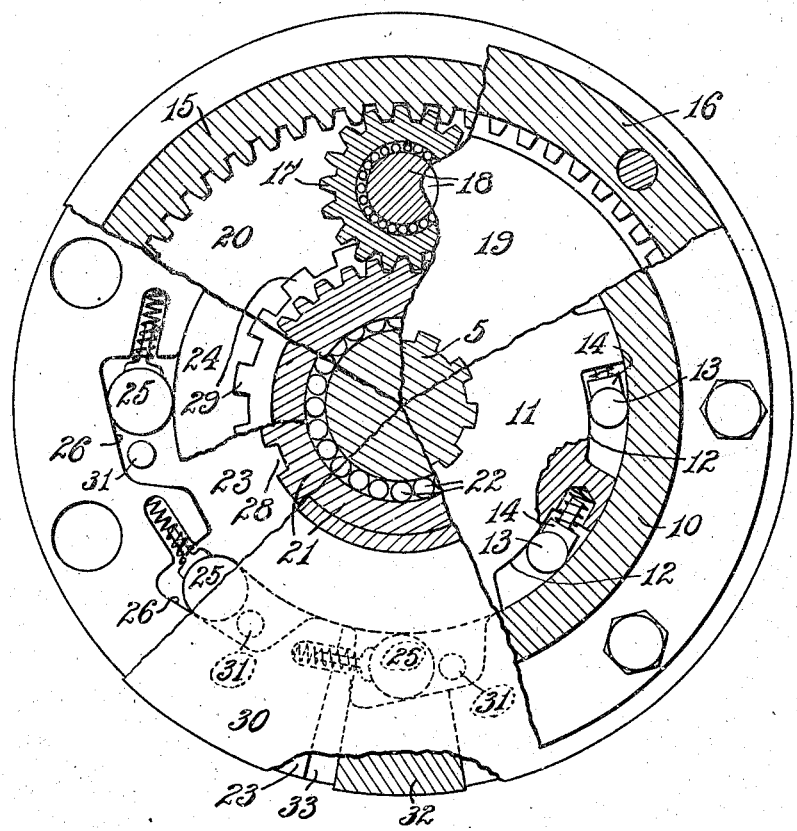
Fig. 3 is a sectional view taken on line 3—3 of Fig. 1.

In the embodiment of the invention illustrated the engine crank shaft 1, which operates in suitable ball bearings 2 in a front wall 3 of the engine casing, has piloted therein the rear end 4 of the propeller shaft 5. The front end of this shaft is supported in suitable ball bearings 6—6 in the front end of the casing 7 and has mounted thereon the usual propeller 8.

Keyed or otherwise secured on the engine shaft 1 is a member 9 having an overhanging portion providing element 10 of an overrunning clutch. The other element 11 of this clutch is keyed or splined on the propeller shaft 5 and the member 11 is provided with cammed surfaces 12, with which an inner periphery or inner surface of the clutch member 10 and suitable roller clutch member 13 are adapted to cooperate, these rollers being biased in their engaging position through the instrumentality of spring-urged shoes 14.

The member 9, in addition to the outer member 10 of the overrunning clutch, is also provided with a ring gear 15 which may be bolted to a flange 16 or may be formed integrally therewith.

Cooperating with this ring gear 15 is a series of planetary pinions 17 mounted on suitable pinion shafts 18 carried in a pinion cage comprising the two side members 19 and 20. The pinion cage is keyed or connected by a spline connection with the propeller shaft 5.

A sun gear 21 with which the pinions 17 cooperate surrounds the propeller shaft 5 being supported thereon by suitable needle or other roller bearings 22 and this sun gear is normally freely rotatable.

Ahead of the nested planetary gearing heretofore described I provide a second overrunning clutch which comprises the outer member 23 and the inner member 24 as well as the clutch rollers 25. In this instance the cam surfaces 26 are formed in the outer member while the surface of the inner member is concentric with the axis thereof. The outer member 23 is drivingly connected with a sleeve forming a part of the sun gear 21 through a toothed connection 28 and the inner member 24 is drivingly connected with the cage member 20 through a suitable toothed connection 29. A kickout member for the rollers 25 is mounted on one face of the clutch member 23 and comprises an annular disc 30 supported on the face of the member 23 and provided with a series of pins 31 which project into the path of the rollers 25. This disc has suitable lugs 32 on one face which take into radial slots 33 on the clutch member 23, the width of the slots being somewhat greater than the lugs 23 to allow for a relative movement between the disc 30 and the overrunning clutch member 23. The diameter of this disc 30 is somewhat greater than the shaft overrunning clutch member 23 for a purpose which will more fully hereinafter appear.

Surrounding the overrunning clutch member 23, which it will be remembered is connected to the sun gear 21, is a brake band 34 suitably anchored as at 35 to the frame 7 and provided with a lever operating mechanism 36. One end of this lever bears on a projection 37 on one of the free ends of the brake band. A bolt extends through the lever intermediate of its ends and this bolt 38 is connected to a projection 39 on the opposite end of the brake band so that when the lever is swung upwardly, looking at Fig. 1, the two ends of the band will be drawn together to grip the surface or periphery of the disc 30 and of the overrunning clutch member 23. A suitable expansion spring 40 serves to separate the free ends of the band when the lever 36 is released.

In operation when the brake band 34 is released, with the engine shaft 1 running, the drive will be direct due to the fact that pinion carrier 19 is drivingly connected with the propeller shaft and likewise, through the medium of the overrunning type clutch including the outer member 23, with the sun gear 21. By this arrangement the parts are practically all locked up and drive as a single unit thereby establishing a direct drive between the engine shaft 1 and the propeller shaft 5.

With the application of the brake band by the contraction thereof through the operation of the lever 36, assuming that the parts are rotating, the band will first engage the periphery of the disc 30 producing a relative movement between this disc and the clutch member 23. Due to this relative movement the pins 31 on the disc 30 will engage the rollers 25 kicking them to disengaged position. A completion of the contraction of the brake band will eventually bring the member 23 to a halt and hold the same stationary thus holding the sun gear 21 stationary and under these circumstances, with the sun gear 21 stationary and the ring gear 15 driving, a drive will be established through the pinion carrier 19 to the propeller shaft 5 at a reduced speed.

Due to the fact that, under these circumstances, the overrunning clutch member 11 is rotating at a speed less than the outer member 10 of the overrunning clutch, the overrunning clutch at the rear of the planetary transmission will disengage and not interfere with the drive above described. If, however, for any reason the operator reduces the speed of the engine shaft 1, as by throttling, the propeller shaft through its momentum, etc., will become the driving member and the inner member of the overrunning clutch will tend to operate at a greater speed than the outer member thus causing the rollers 13 to engage so that the engine will be turned over by the propeller. This construction is essential as it is important that there should be no free wheeling or overrunning action during the normal operation of the plane. The propeller shaft and propeller shaft constitute the flywheel of an aviation engine and if these were disconnected from the engine shaft or allowed to overrun there would not be sufficient inertia to keep the engine firing when the plane is coasting against the engine.

With the propeller being driven at a reduced speed the resumption of the direct drive is quite simple as all that is necessary is to release the brake band 34 from the overrunning clutch member 23 and the direct drive will again be established.

I claim as my invention:

1. In a transmission, the combination with a driving shaft and a driven shaft, of a planetary gearing for drivingly connecting said shafts including a pinion carrier and an axially stationary sun gear, said pinion carrier being connected to the driven shaft, a clutch for connecting said pinion carrier to the sun gear, means for locking said sun gear against rotation, means operated by the locking of said sun gear for disconnecting said clutch, and means for directly connecting said driving and driven shafts independently of said transmission when the driven shaft becomes the driving shaft.

2. In a transmission, the combination of a driving shaft and a driven shaft, of a planetary gearing for drivingly connecting said shafts, including a ring gear connected to the driving shaft, a pinion carrier connected to the driven shaft, an axially stationary sun gear, a clutch for connecting the sun gear to the pinion carrier, and means for disengaging said clutch and holding said sun gear against rotation to establish a reduced speed drive through said gearing and an overrunning clutch interposed between said driving and driven shafts for establishing a driving connection between said driving and driven shafts when the driven shaft becomes the driving shaft.

3. In a transmission, the combination with a driving shaft and a driven shaft, of a planetary gearing drive between said shafts comprising a member connected to the driving shaft and having connected thereto one member of an overrunning clutch and a ring gear, the other member of said over-running clutch being connected to the driven shaft, a pinion carrier drivingly connected to the driven shaft, an axially stationary sun gear, a clutch for connecting said sun gear to the pinion carrier, means for locking said sun gear against rotation, and means operated upon the operation of said locking means for disconnecting said clutch, said overrunning clutch being so arranged as to permit an overrun between the members when the driving shaft drives the driven shaft through said planetary gearing while drivingly connecting said shafts when the driven shaft tends to turn at a greater speed than the driving shaft.

4. The combination with an aeroplane propeller and its shaft, of a driving shaft therefor, a gearing for driving said propeller shaft at a different speed than that of the driving shaft and establishing a two-way drive between said shafts when the drive is through said gearing, and means for maintaining a direct driving connection from the propeller shaft to the driving shaft during the establishment of a different speed drive between said shafts through said gearing.

5. The combination with an aeroplane propeller and its shaft, of an engine shaft, a gearing for driving said propeller shaft at a different speed than that of the engine shaft and establishing a two-way drive between said shafts when the drive is through said gearing and a constantly operative clutch for connecting the propeller shaft to the engine shaft whenever the propeller shaft becomes the driving shaft.

6. The combination with an aeroplane propeller and its shaft, of an engine shaft, a gearing for driving said propeller shaft at a different speed than that of the engine shaft and establishing a two-way drive between said shafts when the drive is through said gearing, and a one-way clutch for drivingly connecting the propeller shaft to the engine shaft whenever the propeller shaft becomes a driving shaft and the drive through said gearing is disconnected.

7. The combination with an aeroplane propeller and its shaft, of an engine shaft, a gearing for driving said propeller shaft at a different speed than that of the engine shaft and establishing a two-way drive between said shafts when the drive is through said gearing, friction clutch means for establishing driving relation between said engine and propeller shafts through said gearing, and constantly active means for driving the engine shaft from the propeller shaft.

8. The combination with an aeroplane propeller and its shaft, of an engine shaft, a speed changing gearing including means for establishing a direct drive between said shafts and a two-way different speed drive between said shafts and means for establishing a driving connection between said shafts during the change from one drive to the other in event the propeller shaft becomes the driving shaft.

9. The combination with an aeroplane propeller and a shaft therefor, of an engine shaft, a speed changing gearing including means for establishing a direct drive between said shafts and a two-way different speed drive between said shafts and a one-way clutch for establishing a driving connection between said shafts independently of said gearing whenever the propeller shaft becomes the driving shaft.

10. In a transmission, the combination with a driving shaft and a driven shaft, gearing, including a control means operative at will for drivingly connecting said shafts, an overrunning clutch between said shafts operative to transmit torque from the driven shaft to the driving shaft when the speed of the former exceeds the speed of the latter, a second overrunning clutch, operative in its normal position, to lock said gearing whereby a direct one-way drive is established between said driving and driven shafts, and means responsive to operation of said control means to a position to render said gearing effective, for releasing said second named overrunning clutch.

WILLIAM B. OSBORNE.